United States Patent [19]

O'Mahony et al.

[11] Patent Number: 5,948,024
[45] Date of Patent: *Sep. 7, 1999

[54] VEHICLE ALIGNMENT CONDITION MEASUREMENT AND DISPLAY

[75] Inventors: Patrick O'Mahony, Cork, Ireland; Norman Johnson, Jr., St. Cloud, Fla.

[73] Assignee: Snap-on Technologies, Inc., Lincolnshire, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/717,732

[22] Filed: Sep. 24, 1996

Related U.S. Application Data

[60] Provisional application No. 60/005,608, Oct. 19, 1995, and provisional application No. 60/005,720, Oct. 20, 1995.

[51] Int. Cl.⁶ .............................. G06F 7/70; G06G 7/76
[52] U.S. Cl. .................. 701/29; 701/35; 364/528.14; 33/203.18; 33/288; 356/155; 356/139.09
[58] Field of Search ................. 701/1, 29, 35; 364/559, 551.01, 560, 562, 528.14, 188; 280/661, 707; 33/288, 203.18, 203.19, 203.2, 203, 759, 763; 356/155, 152.3, 139.09

[56] References Cited

U.S. PATENT DOCUMENTS

| | | | |
|---|---|---|---|
| 4,126,943 | 11/1978 | Senften | 33/228 |
| 4,239,389 | 12/1980 | Hollandsworth et al. | 356/155 |
| 4,265,537 | 5/1981 | Hunter | 356/155 |
| 4,274,739 | 6/1981 | Grubbs et al. | 356/155 |
| 4,338,027 | 7/1982 | Eck | 356/155 |
| 4,381,548 | 4/1983 | Grossman et al. | 701/29 |
| 4,574,490 | 3/1986 | Curchod | 33/203.18 |
| 4,718,759 | 1/1988 | Butler | 33/203.18 |
| 4,977,524 | 12/1990 | Strege et al. | 701/35 |
| 5,208,646 | 5/1993 | Rogers et al. | 33/288 |
| 5,388,057 | 2/1995 | January | 701/35 |
| 5,442,549 | 8/1995 | Larson | 701/35 |
| 5,513,439 | 5/1996 | Brauer et al. | 33/203.18 |
| 5,532,816 | 7/1996 | Spann et al. | 356/152.3 |
| 5,535,522 | 7/1996 | Jackson | 33/288 |
| 5,583,797 | 12/1996 | Fluegge et al. | 364/528.14 |
| 5,598,357 | 1/1997 | Colarelli, III et al. | 701/29 |

FOREIGN PATENT DOCUMENTS

0679865 A1  11/1995  European Pat. Off. .

*Primary Examiner*—Jacques H. Louis-Jacques
*Attorney, Agent, or Firm*—McDermott, Will & Emery

[57] ABSTRACT

An apparatus and methodology for diagnosing an alignment condition of a vehicle. The methodology includes determining an alignment condition of the vehicle using an apparatus set forth herein, and calculating a result corresponding to a difference between the determined alignment condition of the vehicle and specifications for a plurality of alignment conditions stored in a memory. The methodology further includes selecting one of a plurality of graphics stored in the memory, each corresponding to a value defined by the stored specifications, by determining the value to which the result corresponds, and outputting the selected one of the plurality of graphics.

20 Claims, 11 Drawing Sheets

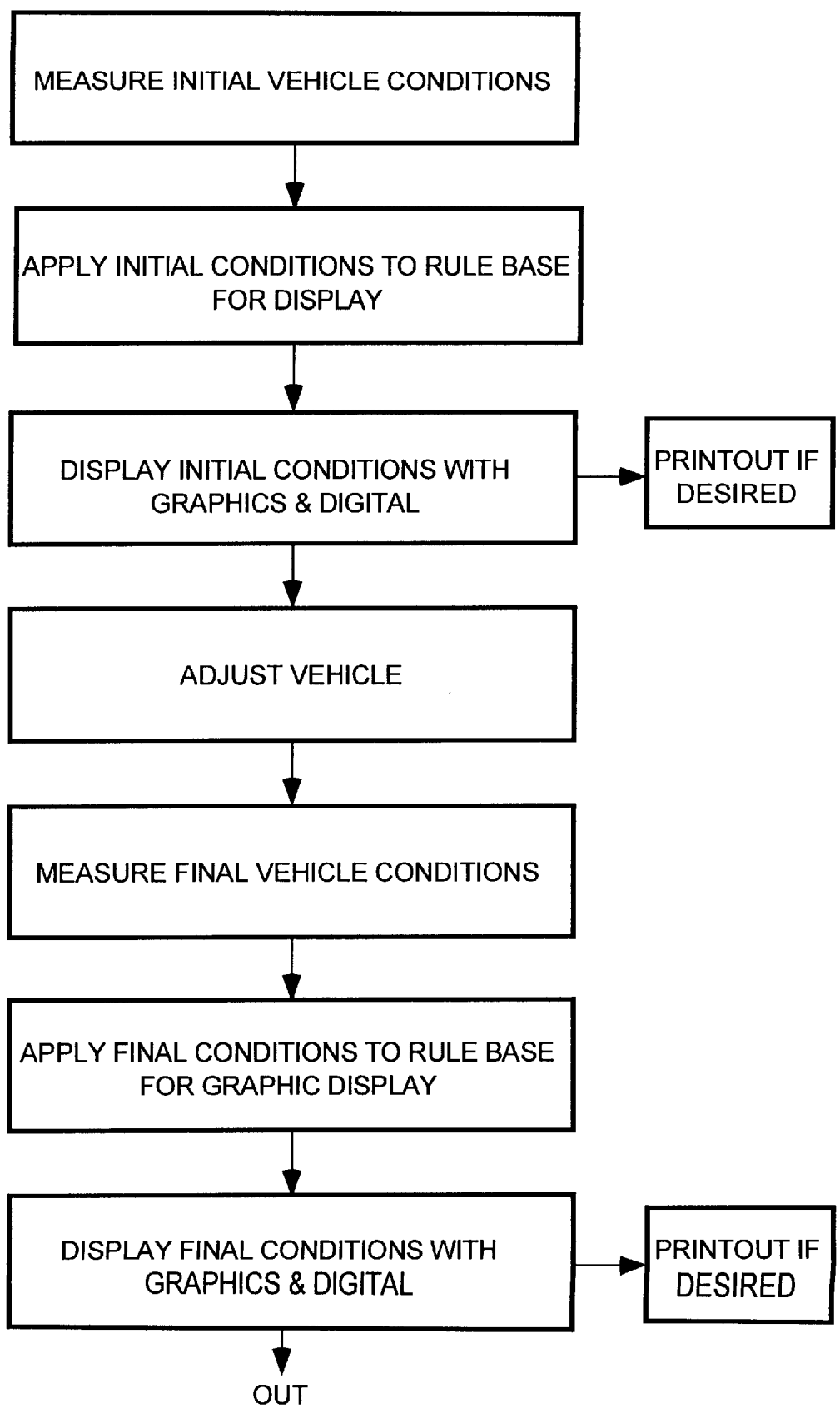

FIG. 4A

| ALIGNMENT VALUE | | SPECIFICATION | | GRAPHIC |
|---|---|---|---|---|
| ABS [TOE] | | < 1.5 mm/m | ⇒ | STRAIGHT GRAPHICS POSITION |
| TOE OUT | | > 1.5 mm/m | ⇒ | TOE OUT GRAPHICS POSITION 1 |
| | & | < 3.0 mm/m | ⇒ | TOE OUT GRAPHICS POSITION 1 |
| TOE OUT | | > 3.0 mm/m | ⇒ | TOE OUT GRAPHICS POSITION 2 |
| TOE IN | | > 1.5 mm/m | ⇒ | TOE IN GRAPHICS POSITION 1 |
| | & | < 3.0 mm/m | ⇒ | TOE IN GRAPHICS POSITION 1 |
| TOE IN | | > 3.0 mm/m | ⇒ | TOE IN GRAPHICS POSITION 2 |

FIG. 4B

| GRAPHIC ILLUSTRATION | LEFT WHEEL | RIGHT WHEEL | AXLE |
|---|---|---|---|
| REF. 1 (FIG. 5A) | STRAIGHT POSITION | STRAIGHT POSITION | STRAIGHT POSITION |
| REF. 2 (FIG. 5B) | TOE OUT POSITION 1 | STRAIGHT POSITION | AXLE LEFT POSITION 1 |
| REF. 3 (FIG. 5C) | TOE OUT POSITION 2 | STRAIGHT POSITION | AXLE LEFT POSITION 2 |
| REF. 4 (FIG. 5D) | TOE OUT POSITION 2 | TOE IN POSITION 1 | AXLE LEFT POSITION 3 |
| REF. 5 (FIG. 5E) | TOE OUT POSITION 2 | TOE OUT POSITION 1 | AXLE LEFT POSITION 4 |
| REF. 6 (FIG. 5F) | TOE OUT POSITION 1 | TOE OUT POSITION 1 | STRAIGHT POSITION |
| REF. 7 (FIG. 5G) | TOE OUT POSITION 2 | TOE IN POSITION 2 | AXLE LEFT POSITION 6 |

REF. 1

REF. 2

REF. 3

REF. 4

REF. 5

REF. 6

REF. 7

FIG. 6A

| CUSTOMER: | | ORDER: | |
|---|---|---|---|

TECHNICIAN:
DATE:
MAKE:                                    MODEL:
REGISTRATION NO.:
CHASSIS NO.:
ODOMETER:

INITIAL TRUCK ALIGNMENT REPORT

| TOE OUT ON TURNS | MAX TURNS | | | MAX TURNS | TOE OUT ON TURNS |
|---|---|---|---|---|---|
| 2°04' | --- | | | --- | 2°05' |

TOTAL TOE
0.95

| CAMBER | LEFT TOE | | | RIGHT TOE | CAMBER |
|---|---|---|---|---|---|
| -0°06' | 0.69 | | | 0.26 | -0°06' |

| CASTER | KPI | | | KPI | CASTER |
|---|---|---|---|---|---|
| 3°58' | 7°54' | | | 7°58' | 4°18' |

TOTAL TOE
1.32

| CAMBER | LEFT TOE | | | RIGHT TOE | CAMBER |
|---|---|---|---|---|---|
| -0°04' | -2.47 | | | 3.80 | -0°03' |

SQUARE
3.14

FIG. 6B

| CUSTOMER: | | ORDER: |
|---|---|---|
| TECHNICIAN: | | |
| DATE: | | |
| MAKE: | | MODEL: |
| REGISTRATION NO.: | | |
| CHASSIS NO.: | | |
| ODOMETER: | | |

INITIAL TRUCK ALIGNMENT REPORT

|  |  | TOTAL TOE −3.22 |  |  |
|---|---|---|---|---|
| CAMBER −0°25' | LEFT TOE −17.09 | | RIGHT TOE 13.87 | CAMBER −0°01' |
| | | SQUARE 15.48 | | |

TANDEM PARALLELISM −12.42

|  |  | TOTAL TOE 1.28 |  |  |
|---|---|---|---|---|
| CAMBER −0°13' | LEFT TOE −27.26 | | RIGHT TOE 28.54 | CAMBER 0°12' |
| | | SQUARE 27.90 | | |

FIG. 6C

| DATE: | | PAGE 1 OF 1 |
|---|---|---|
| CUSTOMER: | | ORDER: |

TECHNICIAN:
MAKE:                   MODEL:
LICENSE NO.:
ODOMETER:
REASON FOR ALIGNMENT:

INITIAL TRUCK ALIGNMENT REPORT

| TOEOUTONTURNS | MAX TURNS | | | MAX TURNS | TOEOUTONTURNS |
|---|---|---|---|---|---|
| 1°25' | --- | | | --- | 1°29' |

| | | TOTAL TOE | | | |
| | | -1.06 | | | |
| CAMBER | LEFT TOE | | | RIGHT TOE | CAMBER |
| 0°16' | 0.67 | | | -1.73 | 0°08' |

| CASTER | KPI | | | KPI | CASTER |
| 4°21' | 5°19' | | | 6°12' | 4°31' |

| | | TOTAL TOE 0.78 | | | |
| CAMBER | LEFT TOE | | | RIGHT TOE | CAMBER |
| -0°12' | 2.23 | SQUARE -1.84 | | -1.45 | -0°16' |

TANDEM PARALLELISM -0.53

| | | TOTAL TOE -4.67 | | | |
| CAMBER | LEFT TOE | | | RIGHT TOE | CAMBER |
| -0°19' | -1.02 | SQUARE -1.31 | | -3.65 | -0°13' |

TANDEM PARALLELISM -4.53

| | | TOTAL TOE 1.02 | | | |
| CAMBER | LEFT TOE | | | RIGHT TOE | CAMBER |
| 0°00' | -2.71 | SQUARE 3.22 | | 3.73 | -0°11' |

TANDEM PARALLELISM -0.80

| | | TOTAL TOE 0.59 | | | |
| CAMBER | LEFT TOE | | | RIGHT TOE | CAMBER |
| 0°03' | -3.72 | SQUARE 4.01 | | 4.31 | 0°05' |

VEHICLE ALIGNMENT CONDITION MEASUREMENT AND DISPLAY

This application is based on U.S. Provisional Patent Application Serial No. 60/005,608 filed on Oct. 19, 1995 and U.S. Provisional Patent Application Serial No. 60/005,720 filed on Oct. 20, 1995.

BACKGROUND OF THE INVENTION

The present invention relates to vehicle wheel aligners which may be adapted for use in performing alignments of non-standard or custom vehicles.

Existing wheel aligners comprise a number of sensors for generating data indicative of the relative orientations of the wheels of a vehicle, a computer for calculating alignment values from the data generated by the sensors and a video display for displaying the alignment values. Additionally, these aligners typically comprise a database of vehicle alignment specifications for a majority of vehicle makes and models. During operation, the computer calculates the alignment values for a subject vehicle and compares these values with the alignment specifications for that vehicle. The differences between the calculated alignment values and the specifications may then be displayed.

SUMMARY OF THE INVENTION

According to the present invention, the aligner comprises a preprogrammed set of instructions for creating graphical representations of the alignment conditions of the vehicle based on measurements obtained both before and after adjustments have been made to the vehicle. The representations may be displayed to the operator during the alignment procedure to provide him a better understanding of the condition of the vehicle, and the representations may be printed out for presentation to the customer to evidence that the vehicle has been serviced properly.

BRIEF DESCRIPTION OF THE DRAWINGS

FIG. 3 is a flow diagram showing the sequence of steps undertaken to generate graphical representations of the conditions of the vehicle according to the present invention;

FIG. 4A is a table showing the visualization rules which are used to produce the graphical representations;

FIG. 4B is a table indexing the graphics referred to in FIG. 4A with the representations shown in FIGS. 5A through 5G;

FIGS. 6A through 6C are exemplary printouts of the graphical representations of a vehicle.

DETAILED DESCRIPTION OF THE PREFERRED EMBODIMENTS

The present invention is primarily implemented through computer software, which can be readily recreated by the person of ordinary skill in the art by following this description. In addition, the invention may be incorporated into a variety of vehicle wheel aligners, but it is particularly useful with wheel aligners designed for use with trucks because of the existence of a great number of components requiring alignment in a truck. Therefore, for purposes of brevity the present invention will be described with reference to an exemplary truck aligner.

Figure 1:
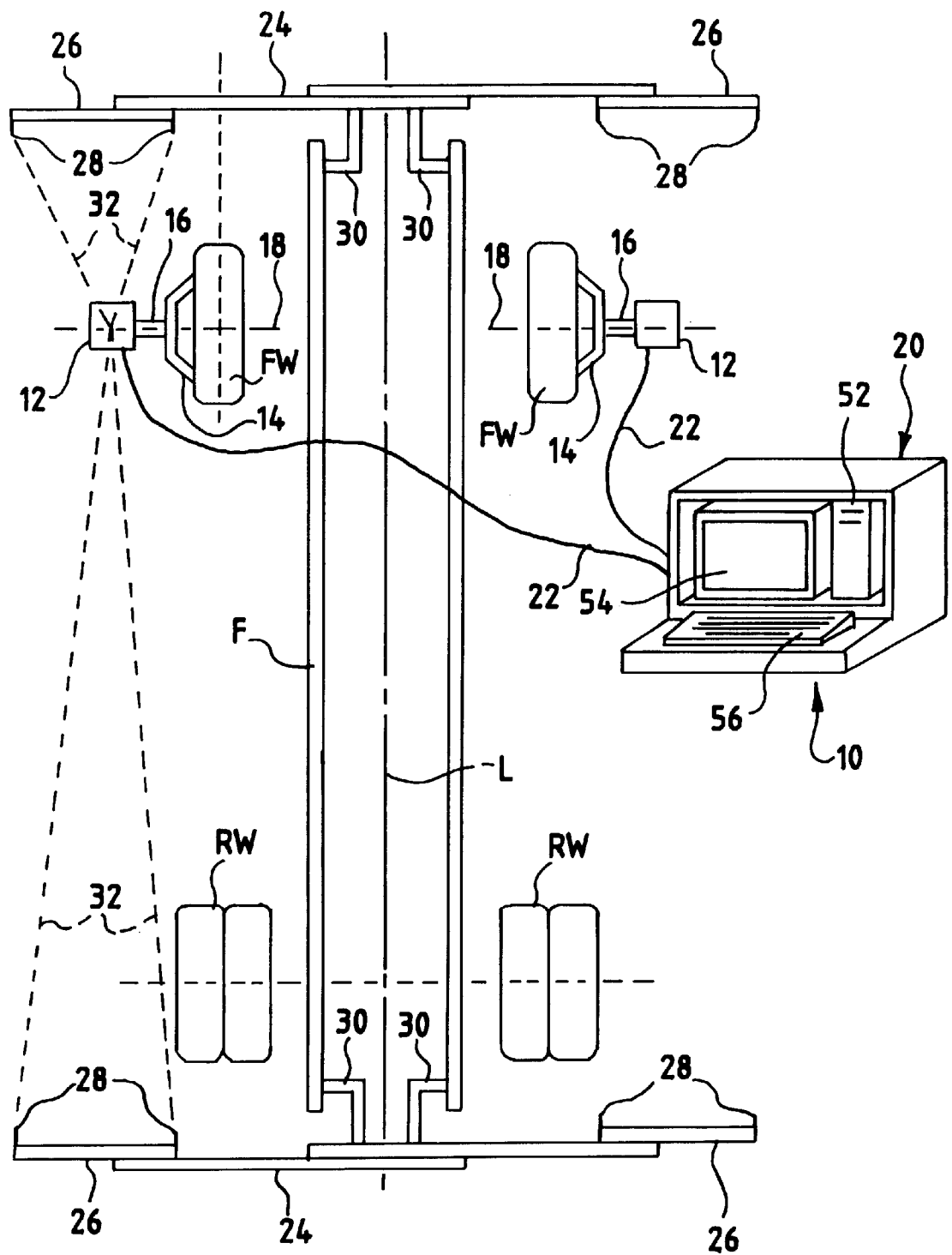
FIG. 1 is a representation of an exemplary wheel aligner in combination with which the present invention may be used.

Referring to FIG. 1, an exemplary truck aligner, indicated generally by reference number 10, is shown in association with a truck which is represented by a frame F having a longitudinal axis L and a set of front wheels FW and rear wheels RW. Truck aligner 10 comprises one or more angle measuring heads 12, which are mountable to the wheels of the truck using appropriate wheel clamps 14. In FIG. 1, a head 12 is shown mounted to each front wheel FW of the truck. Each wheel clamp 14 comprises a shaft 16 and suitable means for aligning shaft 16 with the axis of rotation 18 of the wheel to which it is connected, and the corresponding head 12 is pivotably mounted on shaft 16. Truck aligner 10 also comprises a console 20 to which heads 12 are connected through cables 22 or, alternatively, cordless data transceiver means.

Truck aligner 10 further comprises two frame gauges 24, which each include two scales 26 connected to the opposite ends of frame gauge 24. Each scale 26 in turn comprises a pair of reference marks 28 spaced a known distance from each other. Frame gauges 24 are mounted to opposite ends of frame F using suitable attachment devices 30 having appropriate biasing means for maintaining the same distance between longitudinal axis L and each pair of reference marks 28.

Figure 2:
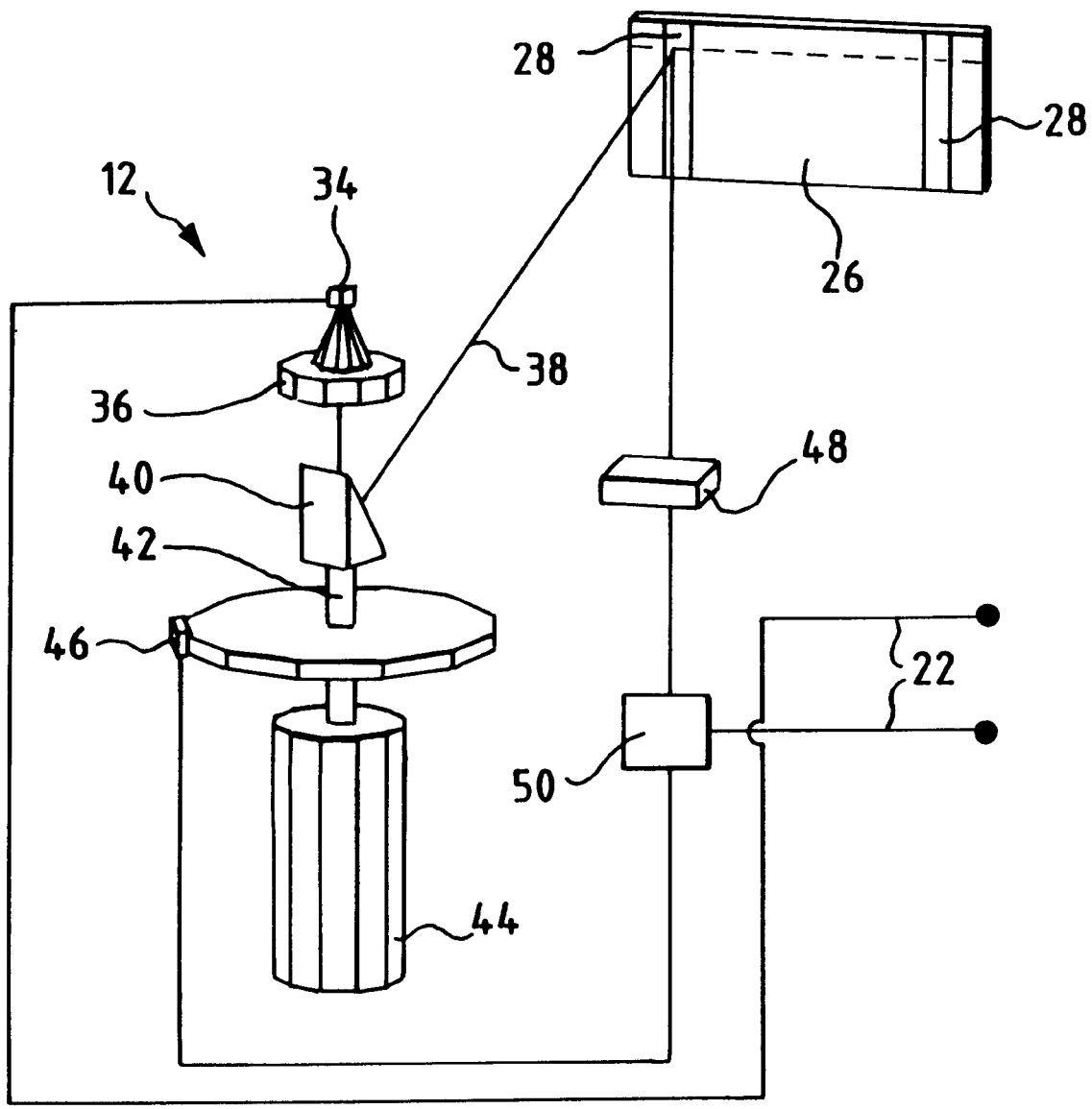
FIG. 2 is a representation of an angle measuring instrument employed in the wheel aligner of FIG. 1.
Figure 5A:
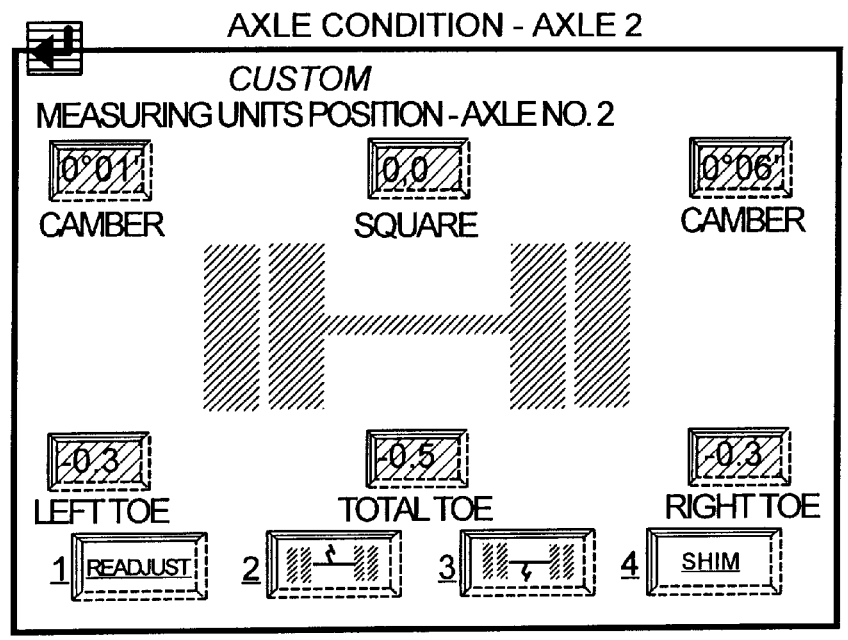
FIGS. 5A through 5G are exemplary displays of the graphical representations of a vehicle.
Figure 5B:
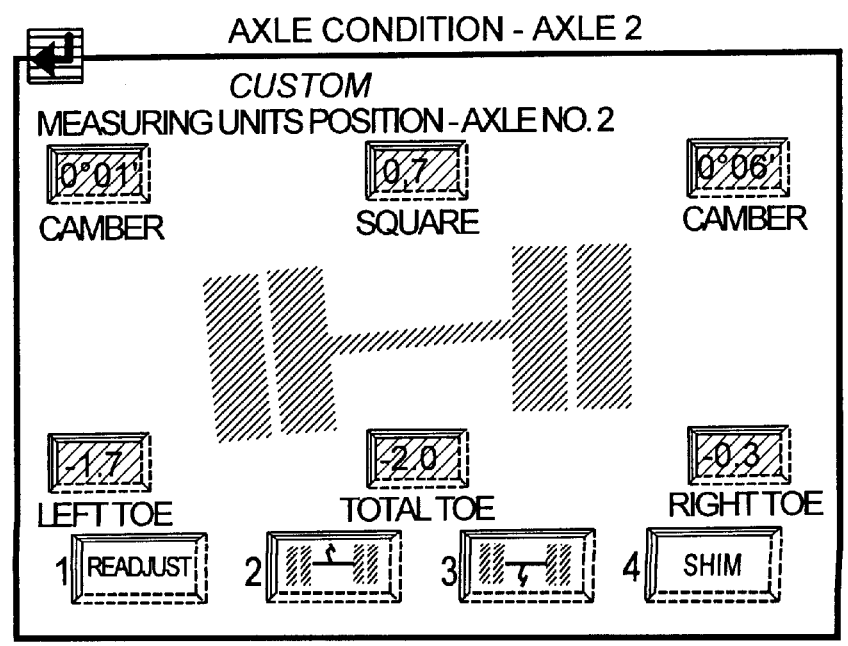
Figure 5C:
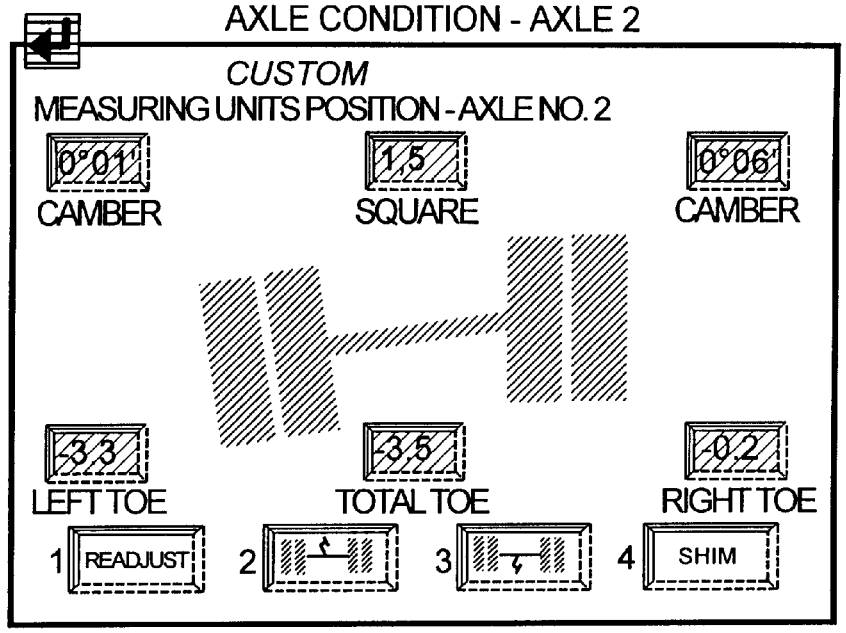
Figure 5D:
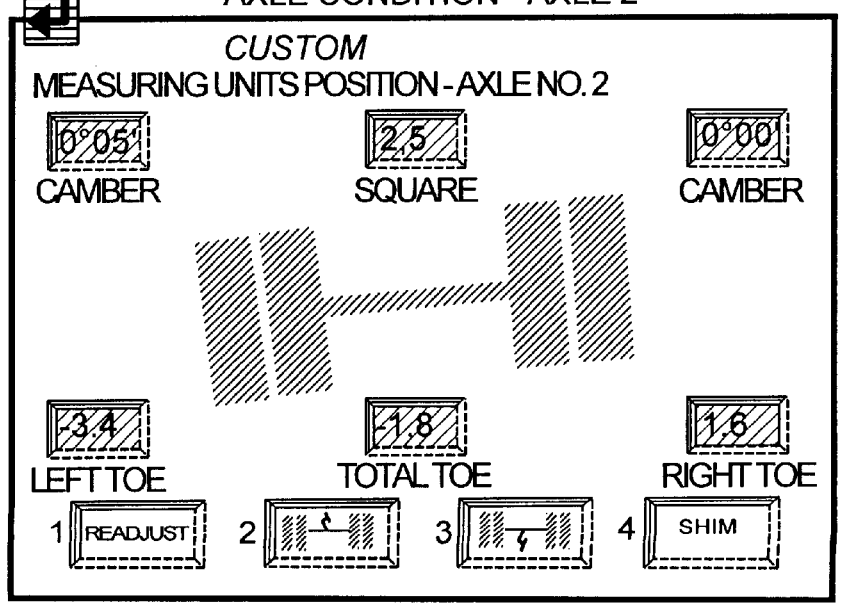
Figure 5E:
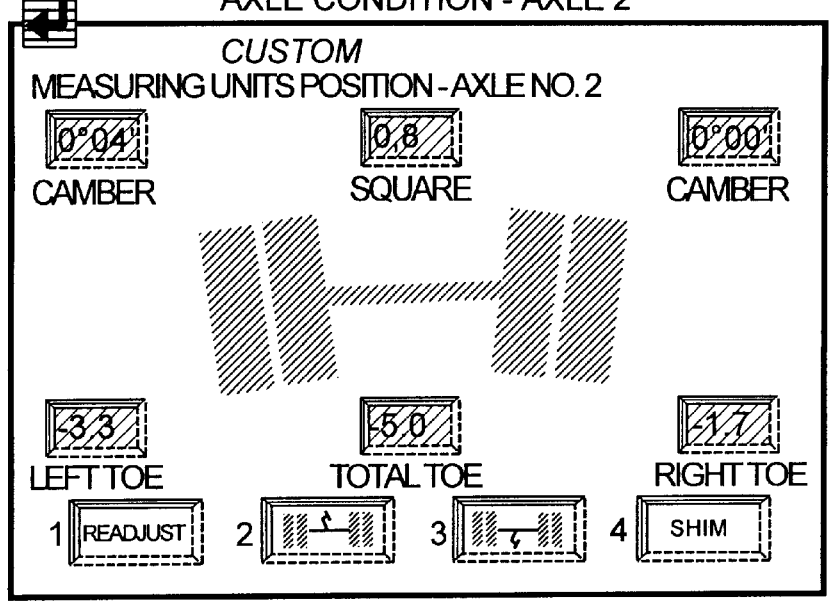
Figure 5F:
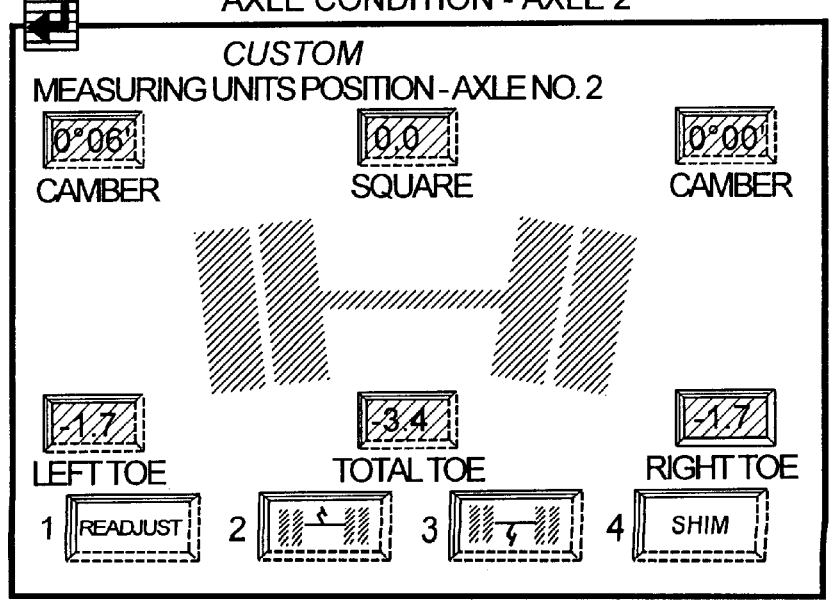
Figure 5G:
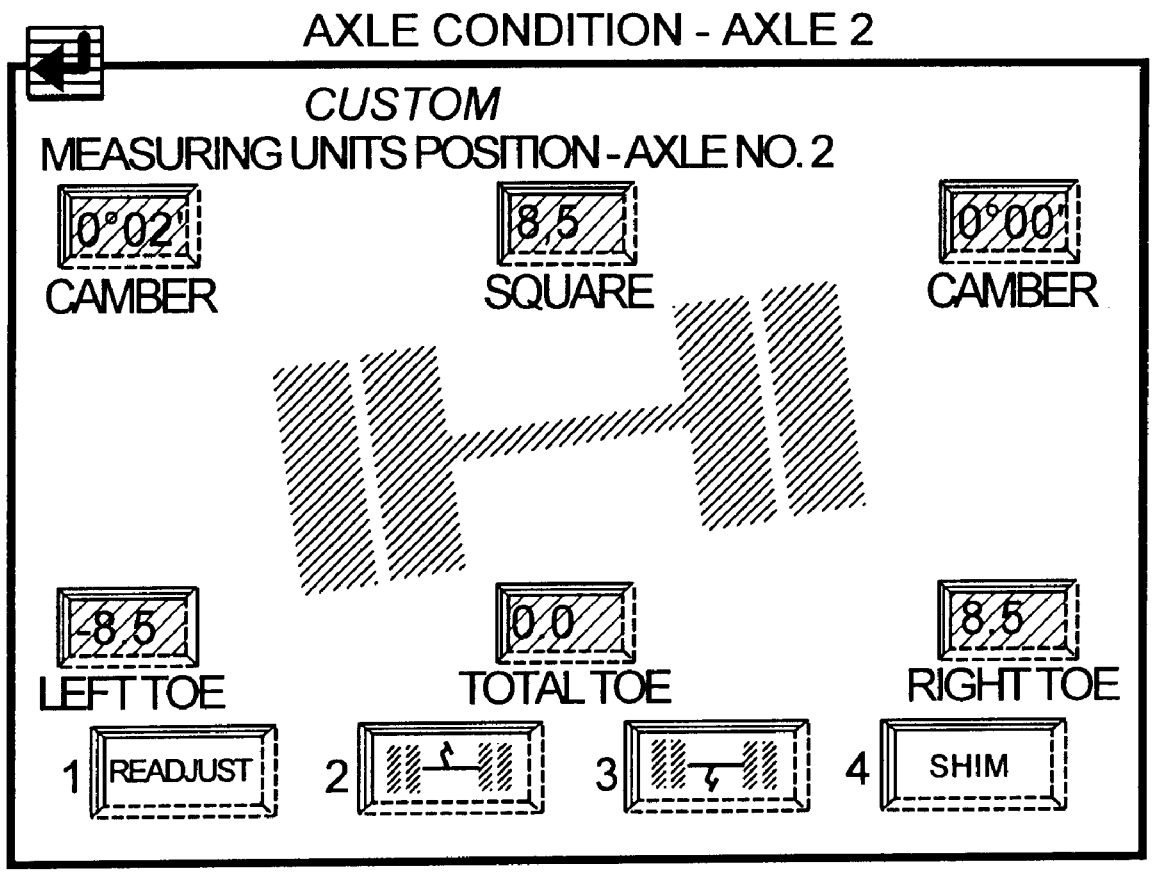

Each angle measuring head 12 operates to measure the angles between the axis of rotation 18 of the wheel on which it is mounted and the lines 32 extending to reference marks 28 on the same side of the truck. Referring to FIG. 2, each head 12 is shown to comprise a light source 34, a collimating lens 36 for focusing the light into a thin beam 38 and a mirror 40 for reflecting beam 38 ninety degrees into an approximately horizontal plane. Mirror 40 is mounted on the shaft 42 of a motor 44, and rotation of mirror 40 by motor 44 causes beam 38 to rotate in the horizontal plane. A rotary encoder 46 mounted relative to shaft 16 continuously tracks the instantaneous angular position of shaft 42, and thus beam 38, with respect to shaft 16. Since shaft 16 is effectively aligned with the axis of rotation 18 of the wheel, encoder 46 measures the angle of beam 38 with respect to the axis of rotation 18. Reference marks 28 on targets 26 are comprised of a retroreflective material, and as rotating beam 38 impinges on a reference mark 28, it will be reflected back to head 12 and received by a detector 48. The signals from encoder 46 and detector 48 are input into an appropriate logic circuit 50, which outputs data indicative of the angle of reference mark 28 relative to shaft 16. As beam 38 rotates through 360 degrees, data relating to the angles of the other three reference marks 28 on the same side of the truck is similarly produced. The data from each head 12 is transmitted over cables 22, or via cordless data transceiver means, to console 20.

Although not shown in the drawings, heads 12 may also include conventional inclinometers for measuring the orientations of the wheels with respect to known vertical reference planes to yield such information as the camber and caster angles of the wheels. The data generated by the inclinometers is transmitted to console 20 in a manner similar to that described above.

Referring again to FIG. 1, console 20 is shown to comprise a programmable computer 52 for controlling the operation of truck aligner 10. In one mode of operation, computer 52 processes the data generated by heads 12 according to preprogrammed instructions and displays the alignment values for the truck on a monitor 54. A keyboard 56 is provided for entering instructions and vehicle information into computer 52. Computer 52 may also access programs and vehicle information through a floppy disk or CD ROM drive (not shown).

According to the present invention, computer 52 comprises a preprogrammed set of instructions for creating graphical representations of the alignment conditions of the vehicle based on measurements obtained both before and after adjustments have been made to the vehicle. Although for purposes of brevity and clarity the invention will be described with respect to the alignment of a truck, it should be understood that the principles of the invention apply to the alignment of many types of vehicles. The person of ordinary skill in the art will readily understand how the invention may be adapted for use with other types of vehicles.

According to the present invention, computer 52 is provided with a set of preprogrammed instructions which will generate video and print representations of the initial conditions of the axles of the vehicle both before and after adjustments are effected. Referring to FIG. 3, the video and print representations are generated by first obtaining measurements of the initial vehicle alignment values and applying the measurements thus obtained to a set of predetermined visualization rules, which are shown in FIG. 4A. Based on these rules, computer 52 generates the graphic and digital representations of the conditions of the axles. These representations are then displayed on monitor 54 and, at the operator's discretion, may be printed out on a standard printer. The vehicle is then adjusted and measurements of the alignment values are again obtained. Computer 52 applies these measurements to the set of visualization rules to generate graphic and digital representations of the final conditions of the axles, which may then be displayed on monitor 54 and/or printed by the printer.

As stated above, FIG. 4A lists the visualization rules that computer 52 employs to generate the graphical representations of the vehicle. The rules select predetermined graphics based on the amount the measured alignment condition differs from the preferred specifications for the alignment condition. Thus, computer 52 will compare the measured alignment condition with the specifications and select one of the predetermined graphics depending on the difference. For example, if the absolute value of the measured toe, or ABS [Toe], for a subject wheel is different from the specification by less than 1.5 millimeters per meter, computer 52 will display the Straight Graphics Position graphic for the wheel. Similarly, if the measured Toe Out for a subject wheel is greater than 1.5 mm/m and less than 3.0 mm/m, the computer will select the Toe Out Graphics Position 1 graphic for the wheel. It should be understood that visualization rules for other components of a vehicle may be created in a similar fashion, and that any number of predetermined graphics may be employed in the visualization rules.

Based on the graphic which the computer selects for each component of the vehicle, the computer will generate a graphical representation of the vehicle. This graphical representation will then be shown on monitor 54 to help the operator understand the alignment condition of the vehicle. In the exemplary truck aligner embodiment, the computer will apply the visualization rules to select a graphic for each axle, which usually includes two wheel sets and a connecting axle. The graphics referred to in FIG. 4A are illustrated in FIGS. 5A through 5G, which are exemplary displays that may appear on monitor 54, depending on the measured alignment condition of a vehicle. For purposes of this description, FIG. 4B references the graphics presented in FIGS. 5A through 5G to the graphics positions designated in FIG. 4A. Thus, to view an exemplary Toe Out Graphics Position 1 graphic, reference may be made to the left wheel of the axle shown in FIG. 2. Finally, FIGS. 6A through 6C illustrate exemplary printouts obtainable from the present invention.

Thus, the operator is provided with a visual representation of the conditions of the axles before he performs the alignment adjustments. This illustration of the initial condition of the vehicle may be presented to the customer as evidence that the vehicle does indeed require service. Furthermore, the operator is provided with a visual representation of the conditions of the axles after the operator performs the alignment adjustments. This enables the operator to determine whether the alignment has been performed properly. In addition, the illustration for the final condition of the vehicle may be presented to the customer as evidence that an alignment has been performed.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A method of diagnosing an alignment condition of a vehicle, said method comprising the machine implemented steps of:

(a) determining an alignment condition of the vehicle;
   (b) calculating a result corresponding to a difference between the determined alignment condition of the vehicle and specifications for a plurality of alignment conditions stored in a memory;
   (c) automatically selecting one of a plurality of graphics stored in the memory, each corresponding to a value defined by the stored specifications, in accordance with the value to which the result corresponds; and
   (d) outputting the selected one of the plurality of graphics.

2. The method according to claim 1, wherein each of the plurality of graphics corresponds to a range of values as defined by the stored specifications.

3. The method according to claim 1, wherein said method further comprises the step of outputting the determined alignment condition of the vehicle.

4. The method according to claim 1, wherein the plurality of graphics includes a pictorial representation of an alignment condition.

5. The method according to claim 4, wherein said method further comprises the step of outputting the determined alignment condition of the vehicle.

6. The method according to claim 1, wherein the plurality of graphics represents a alignment condition including an alignment condition for an axle of the vehicle and each wheel on the axle.

7. The method according to claim 1, wherein each of the plurality of graphics depicts an alignment condition corresponding to the value as defined by the stored specifications.

8. A method of diagnosing an alignment condition of a vehicles said method comprising the steps of:

(a) determining an alignment condition of the vehicle;
   (b) calculating a result corresponding to a difference between the determined alignment condition of the vehicle and specifications for a plurality of alignment conditions stored in a memory;

(c) selecting one of a plurality of graphics stored in the memory, each corresponding to a value defined by the stored specifications, by determining the value to which the result corresponds;

(d) outputting the selected one of the plurality of graphics;

(e) changing the alignment condition of the vehicle based upon the selected one of the plurality of graphics to an adjusted alignment condition;

(f) determining the adjusted alignment condition of the vehicle; and (g) repeating steps (b) through (d) for the adjusted alignment condition.

9. A method of diagnosing an alignment condition of a vehicle, said method comprising the steps of:

(a) determining an alignment condition of the vehicle;

(b) calculating a result corresponding to a difference between the determined alignment condition of the vehicle and specifications for a plurality of alignment conditions stored in a memory;

(c) selecting one of a plurality of graphics stored in the memory each corresponding to a value defined by the stored specifications, by determining the value to which the result corresponds;

(d) outputting the selected one of the plurality of graphics, wherein the step of determining an alignment condition of the vehicle is performed by an apparatus comprising:

at least one angle measuring head mountable to a wheel of the vehicle for alignment with an axis of rotation of the wheel, the at least one angle measuring head adapted to produce a light beam projecting along an approximately horizontal plane, and a rotation device adapted to rotate the beam about an approximately vertical plane;

a pair of gauges each mounted to opposite ends of the vehicle, the pair of gauges each having a pair of reference marks spaced a preset distance from each other, the pair of reference marks each having a material to reflect the beam;

an encoder configured to measure an angle of the beam relative to the axis of rotation of the wheel and produce a first data signal;

a detector to sense the receipt of the light beam reflected from the reference marks and produce a second data signal; and a computer programmed to determine the alignment condition of the vehicle on the basis of the first and second data signals.

10. A method of diagnosing an alignment condition of a vehicle, said method comprising the machine implemented steps of:

storing specifications for a plurality of alignment conditions;

storing a plurality of graphics, each corresponding to a value defined by the stored specifications;

determining an alignment condition of the vehicle;

calculating a result corresponding to a difference between the determined alignment condition of the vehicle and the stored specifications;

automatically selecting one of the plurality of graphics in accordance with the value to which the result corresponds; and outputting the selected one of the plurality of graphics.

11. An apparatus for measuring an alignment condition of a vehicle, said apparatus comprising:

at least one angle measuring head mountable to a wheel of the vehicle for alignment with an axis of rotation of the wheel, said at least one angle measuring head adapted to produce a light beam projecting along an approximately horizontal plane, and a rotation device adapted to rotate the beam about an approximately vertical plane;

a pair of gauges each mounted to opposite ends of the vehicle, said pair of gauges each having a pair of reference marks spaced a preset distance from each other, said pair of reference marks each having a material to reflect the beam;

an encoder configured to measure an angle of the beam relative to the axis of rotation of the wheel and produce a first data signal;

a detector to sense the receipt of the light beam reflected from said reference marks and produce a second data signal; and a computer programmed to determine the alignment condition of the vehicle on the basis of the first and second data signals.

12. The apparatus according to claim 11, wherein:

said computer includes a memory for storing specifications for a plurality of alignment conditions, and a plurality of graphics, each of the plurality of graphics corresponding to a value defined by the stored specifications; and said computer being programmed to calculate a result equal to a difference between the determined alignment condition of the vehicle and the stored specifications, select one of the plurality of graphics by determining to which value the result corresponds, and output the selected one of the plurality of graphics.

13. The apparatus according to claim 12, wherein each of said plurality of graphics corresponds to a range of values as defined by the stored specifications.

14. The apparatus according to claim 12, wherein:

said computer is further programmed to output the determined alignment condition of the vehicle; and said plurality of graphics includes a pictorial representation of an alignment condition.

15. The apparatus according to claim 11, wherein said at least one angle measuring head includes a light source adapted to produce light, a lens adapted to focus the light into a beam, a reflector adapted to reflect the beam along an approximately horizontal plane.

16. The apparatus according to claim 15, wherein said rotation device is adapted to rotate said reflector.

17. The apparatus according to claim 15, wherein said lens is a collimating lens.

18. The apparatus according to claim 11, wherein said pair of gauges are each mounted on an opposing end of the frame of a vehicle under test.

19. The apparatus according to claim 11, wherein said pair of frame gauges each have a scale connected thereto, said scale including said a pair of reference marks.

20. The apparatus according to claim 11, wherein said at least one angle measuring head is mounted to the wheel of the vehicle by a wheel clamp having a shaft.

* * * * *